(12) United States Patent
Lai

(10) Patent No.: US 7,290,842 B1
(45) Date of Patent: Nov. 6, 2007

(54) COMPUTER BACK PANEL WHICH CAN BE QUICKLY ASSEMBLED OR DISASSEMBLED

(75) Inventor: Vincent Lai, Taoyuan Hsien (TW)

(73) Assignee: In Win Development, Inc., Taoyuan Hsien (TW)

( * ) Notice: Subject to any disclaimer, the term of this patent is extended or adjusted under 35 U.S.C. 154(b) by 0 days.

(21) Appl. No.: 11/404,795

(22) Filed: Apr. 14, 2006

(51) Int. Cl.
*A47B 97/00* (2006.01)
(52) U.S. Cl. .................................................. 312/223.2
(58) Field of Classification Search ............. 312/223.1, 312/223.2, 257.1, 265.5, 265.6; 361/724, 361/725, 726
See application file for complete search history.

(56) References Cited

U.S. PATENT DOCUMENTS 6,054,662 A * 4/2000 Hrehor et al. .............. 200/332

6,209,975 B1 * 4/2001 Lai .......................... 312/223.2

* cited by examiner

*Primary Examiner*—James O. Hansen
(74) *Attorney, Agent, or Firm*—Pro-Techtor Int'l Services

(57) ABSTRACT

A computer back panel which can be quickly assembled or disassembled is installed at a rear side of a computer casing by extending inverted hooks of the back panel into hook holes of the casing, and pushing up the back panel, which enables a locking slot at a top end of the back panel to be locked and positioned by a locking hook from a slope of the locking hook of a push member. On the other hand, when disassembling the back panel, a user only needs to press the push member to release the locking hook from the locking slot of back panel, and then the inverted hooks of back panel will be released downward from the hook holes of casing to uninstall the back panel. Therefore, the back panel is provided with a function of easy and quick assembling or disassembling.

3 Claims, 5 Drawing Sheets

COMPUTER BACK PANEL WHICH CAN BE QUICKLY ASSEMBLED OR DISASSEMBLED

BACKGROUND OF THE INVENTION (a) Field of the Invention

The present invention relates to a computer back panel, and more particularly to a computer back panel which can be quickly assembled or disassembled.

(b) Description of the Prior Art

A conventional back panel at a rear side of a computer casing is fixed on the casing primarily with screws, which is time consuming, requires a lot of efforts, and cannot be done without a tool such as a screw driver; therefore, this kind of assembling and disassembling method is very troublesome and needs a lot of works.

SUMMARY OF THE INVENTION

Accordingly, the primary object of present invention is to install a push member on a rear side of a computer casing to fix a back panel by latching a locking hook at a bottom of the push member into a locking slot of the back panel; whereas, when uninstalling the back panel, it can be quickly and easily disassembled from the computer by a simple pressing.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
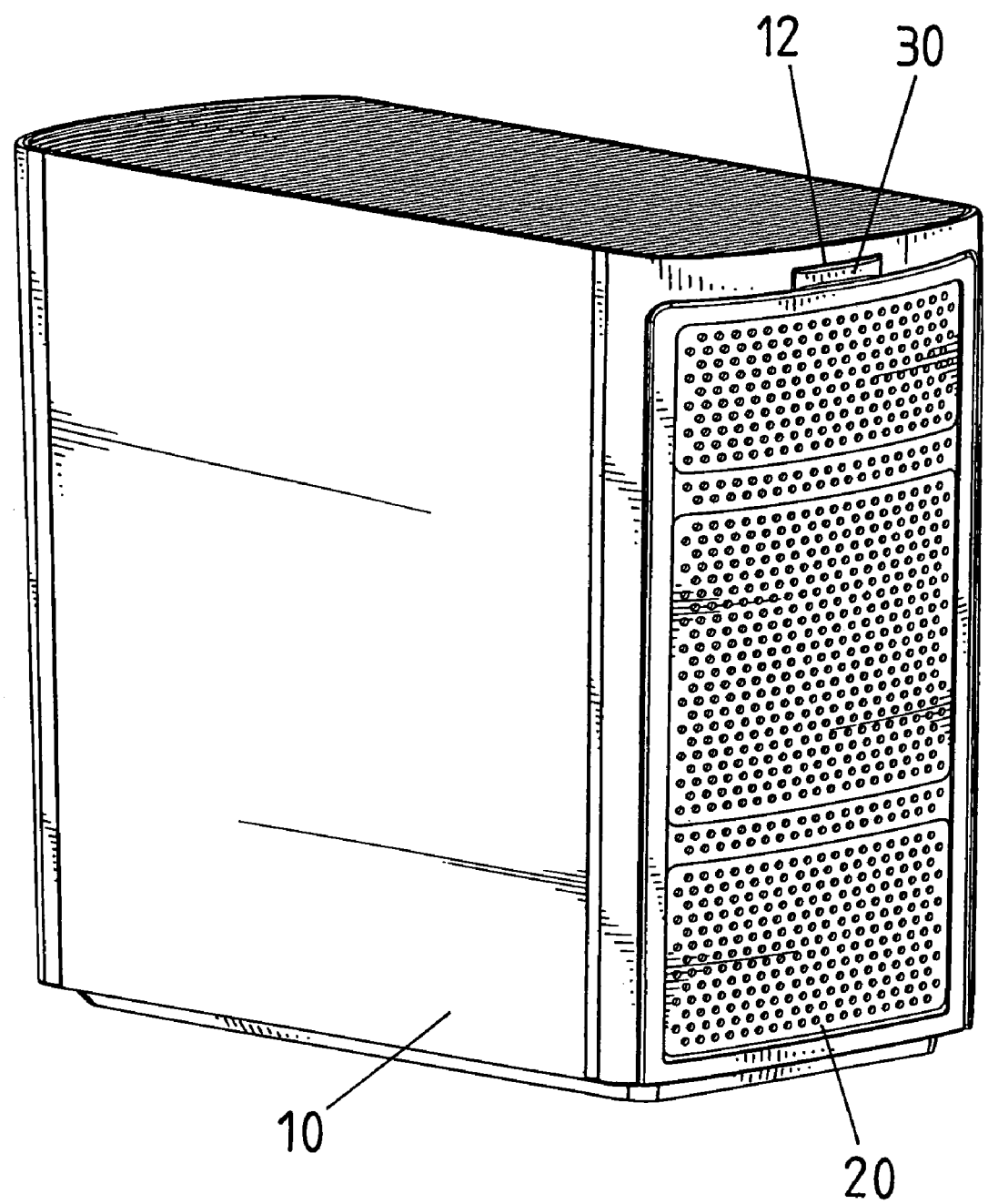
FIG. 1 shows a schematic view of an appearance of the present invention.
Figure 2:
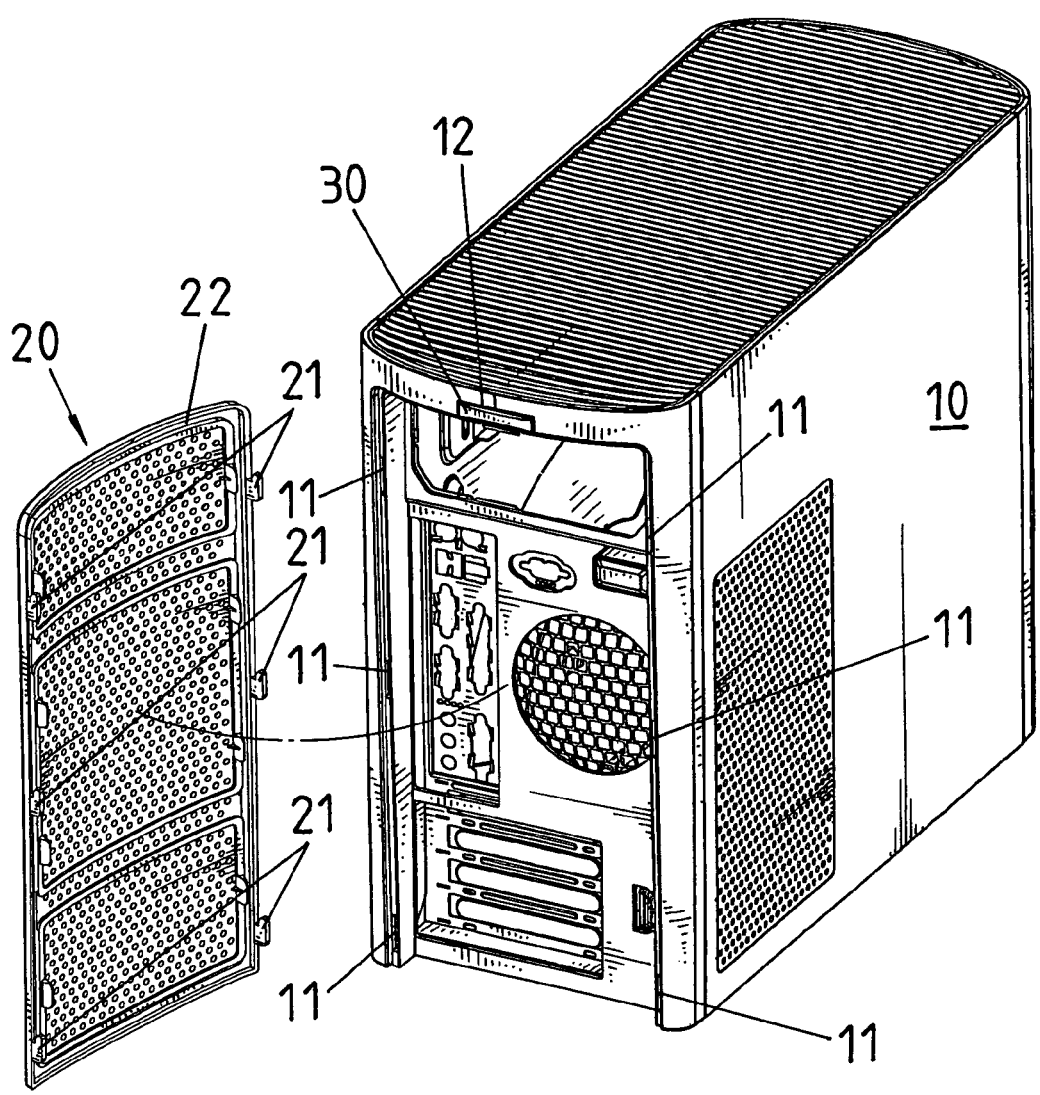
FIG. 2 shows an exploded view of a back panel of the present invention.
Figure 3:
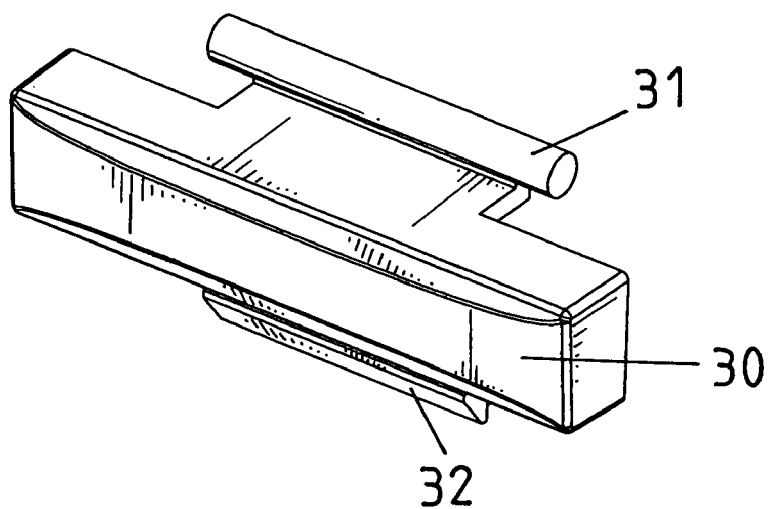
FIG. 3 shows a schematic diagram of an appearance of a push member of the present invention.
Figure 4:
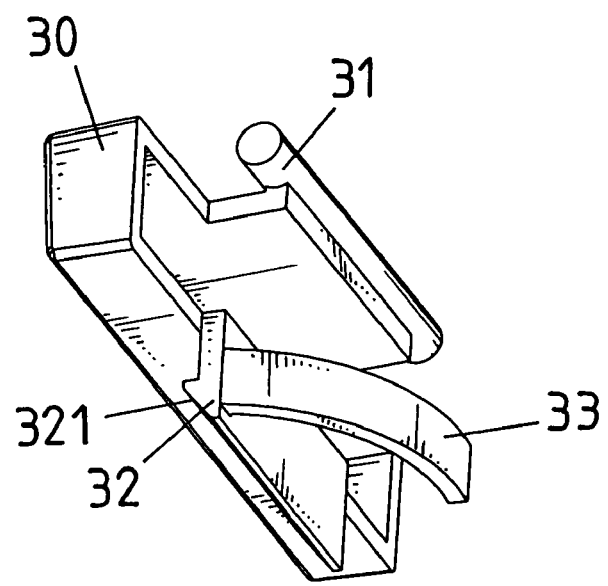
FIG. 4 shows another schematic view of an appearance of a push member of the present invention.
Figure 5:
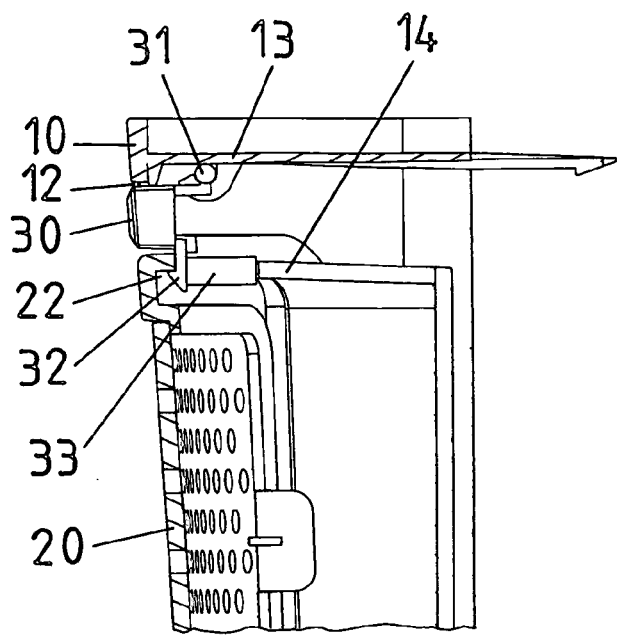
FIG. 5 shows a local cutaway view of a back panel being locked on a casing of the present invention.

Referring to FIG. 1 and FIG. 2, a rear side of a computer casing 10 is provided with a back panel 20, and two ends at the rear side of computer casing 10 are installed with a plurality of hook holes 11, respectively. A plurality of inverted hooks 21 are also installed at two ends of an inner side of the back panel 20, at positions corresponding to those of the hook holes 11. When the inverted L-shape inverted hook 21 is extended into the hook hole 21 of casing 10, and the back panel 20 is pushed up from below, the inverted hook 21 is locked into the hook hole 11 of casing 10, and the back panel 20 is locked on the casing 10 with a locking hook 32 at a bottom end of a push member 30. Referring to FIG. 3 and FIG. 4, a rear side of top end of the push member 30 is provided with a shaft rod 31, and a bottom end of the push member 30 is provided with the locking hook 32 which is installed with a bended elastic member 33 at a rear side thereof. Referring to FIG. 5, when the push member 30 is emplaced into a slot 12 at a center of top end of the casing 10, the shaft rod 31 is pivoted at an inner side of a top frame 13 of casing 10, and the elastic member 33 at a rear side of locking hook 32 is abutted on an inner frame 14 of casing 14. In addition, an end of the locking hook 32 of push member 30 is provided with a slope 321 to facilitate locking and positioning the push member 30 into a locking slot 22 at an inner side of top rim of the back panel 20.

Figure 7:
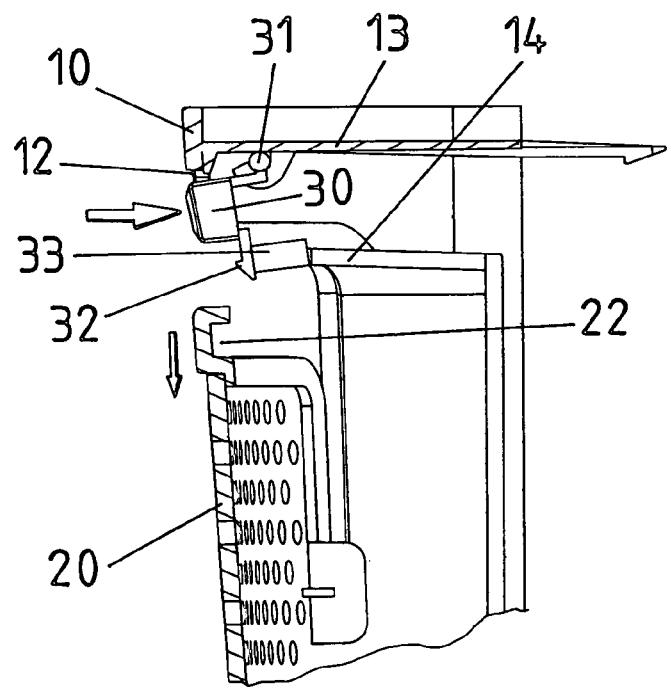
FIG. 7 shows a local cutaway view upon disassembling a back panel of the present invention.
Figure 6:
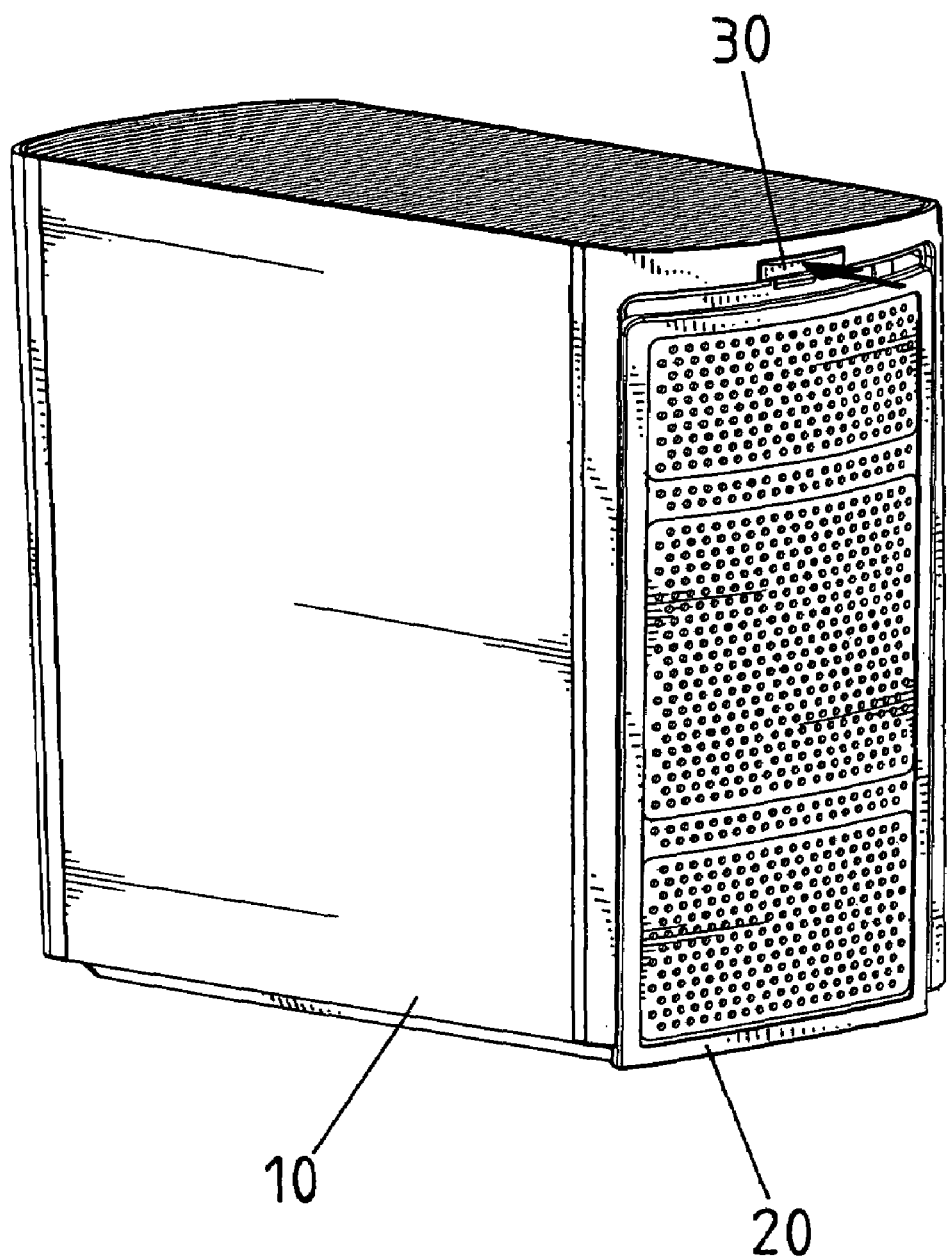
FIG. 6 shows a schematic view of an embodiment of the present invention.

Referring to FIGS. 6 and 7, when a user is to disassemble the back panel 20, he or she only needs to press the push member 30 inward, and the push member 30 will be shifted downward with the shaft rod 31 as a center to squeeze the elastic member 33, enabling the locking hook 32 to be released from the locking slot 22 of back panel 20. In the mean time, the back panel 20 will be dropped down and the inverted hooks 21 at two sides thereof will be released from a hooking of the hook holes 21 of casing 10 respectively, thereby uninstalling the back panel 20.

Accordingly, when installing the back panel of present invention, the user only needs to extend the inverted hooks of back panel into the hook holes of casing and push up the back panel, and then it can be installed easily; on the other hand, when disassembling the back panel, he or she only needs to press the back panel, and then it will be uninstalled easily. Therefore, the user can very easily and quickly assemble or disassemble the back panel.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A computer casing with a back panel which can be quickly assembled or disassembled at a rear side thereof, comprising a front casing, two ends at a rear side of which are provided with at least one hook hole, a top end at the rear side of which is provided with a slot, and an interior of which is provided with a top frame and an inner frame;

a back panel, two ends of an inner side of which are provided with at least one inverted hook to be locked into the hook hole of the front casing, and an inner side of a top rim of which is provided with a locking slot; and a push member which is emplaced in the slot of the front casing with a rear side of a top end thereof being provided with a shaft rod for being pivoted at an inner side of the top frame of the front casing, and a bottom end thereof being provided with a locking hook to be locked into the locking slot of the back panel, a rear side of the locking hook being provided with an elastic member which is abutted on the inner frame of the front casing;

wherein the back panel may be quickly assembled by extending the inverted hooks of the back panel into the hook holes of the front casing and pushing up the back panel; and further the back panel may be uninstalled by pressing the push member.

2. The computer casing with a back panel which can be quickly assembled or disassembled according to claim 1, wherein the inverted hook of back panel is in an inverted L-shape.

3. The computer casing with a back panel which can be quickly assembled or disassembled according to claim 1, wherein an end of the locking hook of push member is provided with a slope.

* * * * *